United States Patent Office 3,752,768
Patented Aug. 14, 1973

3,752,768
CURING AGENT
John F. Thompson, Morenci, and Townsend H. Porter, Adrian, Mich., assignors to Anderson Development Company, Adrian, Mich.
No Drawing. Filed Aug. 23, 1971, Ser. No. 174,199
Int. Cl. C07c 87/54; C08f 45/72
U.S. Cl. 252—182        7 Claims

ABSTRACT OF THE DISCLOSURE

A liquid composition useful for curing epoxy resins, urethane foams and urethane elastomers is prepared by condensing aniline, 2-chloroaniline, 2,5-dichloroaniline and formaldehyde in certain ratios in the presence of an acid.

BACKGROUND OF THE INVENTION

This invention relates to a novel liquid composition useful for curing polymeric compositions. More particularly, this invention relates to a liquid amine crosslinking agent which is especially useful in the curing of epoxy resins and urethane polymers, foamed and unfoamed.

Epoxy or epoxide resins are characterized by having reactive epoxide groups in the resin structure and are commonly available in both liquid and solid form. As used herein the term "epoxy resin" is to be considered inclusive of any epoxy resin whether in the liquid or solid state.

Typical epoxy resins contemplated herein include the diglycidyl ether of bisphenol A (and its homologues), glycidyl ethers of glycerol, glycidyl ethers of bisphenol F and other long chain bisphenols, glycidyl ethers of tetrakis-(hydroxyphenyl)ethane and epoxylated novolaks. In addition, reference is made to the epoxy resins described in "Epoxy Resins," by Henry Lee and Kris Neville, McGraw-Hill Book Co., Inc. (1957).

One of the characteristic features of the epoxy resins is their inherent ability to transform from a thermoplastic state to a thermoset state. This is typically accomplished by means of a crosslinking or curing agent. The prior art curing agents may be broadly classified as amines, amides and anhydrides, such as p,p'-methylene dianiline, hexamethoxy methyl melamine, 3 - isopropylamino - propylamine, 1,2 - diaminopropane, meta-xylene diamine, diethylamino-propylamine, diethylene triamine, triethylene diamine, 4-chloro-orthophenylene diamine, phthalic anhydride, dicyandiamide and the like.

The amount of crosslinking or curing agent used will depend on the nature of the epoxy resin and the kind of curing agent. For example, with crosslinking amines the customary method is to allow one epoxy group for each primary amino group of the agent, the typical concentration being from about 15 to about 30 phr. (parts by weight of agent per 100 parts by weight of resin). With tertiary amine curing agents, the concentration of the amines is from about 5 to 15 phr. With anhydride curing agents, the concentration of the anhydride will be such as to give anhydride carboxyl per epoxy gram equivalent.

In addition, the epoxy resin compositions may contain fillers or pigments such as alumina trihydrate, barium sulfate, calcium carbonate, chrome green, iron blues, lithopones, vermillion, white lead, magnesium carbonate, and metal oxides such as zirconium oxide, titanium dioxide, zinc oxide and the like.

Polyurethanes have been defined as those polymers containing the characteristic urethane linkage,

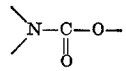

Other atoms such as sulfur, nitrogen, and carbon can be substituted for the linking oxygen atom —O—. The "urethane polymers" comprise not only homopolymers but also copolymers wherein the urethane may be only one of many types of linkages in the polymer chain. Thus, a polyurethane may also be comprised of a wide variety of other groups and linkages including oxy, thio, nitrogen and carbon containing members such as amino, sulfoamino, ester, ether and hydrocarbon groups and linkages.

The resulting polyurethanes may be linear or three-dimensional, the latter also being known as space-polymers prepared from polyfunctional reactants. This invention is particularly useful in the preparation of three-dimensional polyurethanes, especially flexible and rigid polyurethane foams.

The utility of cellular or foamed polyurethane has become well established over the past several years with flexible foams being used for furniture and automotive cushioning, mattresses, clothing interliner and a multitude of other applications. Similarly, rigid foams have gained acceptance as thermal insulation for refrigerated truck trailers and home refrigerators, and as a protective packaging material among many other applications.

Many of the crosslinking and curing agents used for epoxy resins as noted above are also useful in the preparation of polyurethanes.

Among the primary aromatic amines which are known is a certain group formed by the reaction of unsubstituted and/or substituted anilines with formaldehyde in a molar ratio of about 2:1 to form what is most readily referred to as methylene dianilines. These compounds in various forms are useful as curing or crosslinking agents for polyurethane elastomers, polyurethane foams and epoxy resins. See, for example, U.S. Letters Patent Nos. 3,358,025; 3,379,691; 3,412,071; 3,427,282; 3,457,234; and 3,563,906; and British specification No. 1,142,667.

Of special interest with regard to this invention are particular methylene dianiline mixtures such as those shown in U.S. Letters Patent Nos. 3,379,691 and 3,412,071 and British specification No. 1,142,667. For example, the reaction products of aniline, 2-chloroaniline and formaldehyde are mixtures of 4,4' - methylene-dianiline, 4,4'-methylene-bis-2-chloroaniline and 2-chloro-4,4'-methylene-dianiline. Certain mixtures such as those described in U.S. Letters Patent No. 3,412,071 show distinct advantages as polyurethane curing agents over 4,4'-methylene-dianiline or 4,4'-methylene-bis-2-chloroaniline or mixtures thereof. Other mixtures such as those described in British specification No. 1,142,667 show similar advantages and are all supercooled liquids at room temperature as compared to the principally solid mixtures of U.S. Letters Patent No. 3,412,071. The reaction products of 2-chloroaniline, 2,5-dichloroaniline and formaldehyde are mixtures of 4,4'-methylene-bis-2-chloroaniline, 4,4'-methylene-bis-2,5-dichloroaniline and 2,2',5 - trichloro - 4,4' - methylene-dianiline as described in U.S. Letters Patent No. 3,379,691. These mixtures are also useful as polyurethane curing agents.

The reaction products of aniline, 2-chloraniline and formaldehyde are shown by the art cited above to give pot lives of at least 2 minutes. The reaction products of 2-chloroaniline, 2,5-dichloroaniline and formaldehyde are shown by the art cited above to give pot lives of at least 13 minutes.

In accordance with the practice of this invention, it has been surprisingly discovered that certain reaction products of aniline, 2-chloroaniline, 2,5-dichloranaline and formaldehyde, said products being mixtures hereinafter described and claimed, have excellent shelf life but somewhat shorter pot lives than the mixtures of the prior art and yet give improved resilience in cured polymer systems, especially when employed in polyurethane foams.

SUMMARY OF THE INVENTION

This invention comprises, as a new composition of matter a mixture consisting essentially of (a) from 5 to 14 weight percent of 4,4'-methylene dianiline;
(b) from 30 to 50, preferably 39 to 43, weight percent of 4,4'-methylene bis-2-chloroaniline;
(c) from 2 to 6 weight percent of 4,4'-methylene bis-2,5-dichloroaniline;
(d) from 5 to 10 weight percent of 2-chloro-4,4'-methylene dianiline (or 2-chloro-4,4'-diamino diphenyl methane);
(e) from 1 to 3 weight percent of 2,5-dichloro-4,4'-methylene dianiline; and
(f) from 27 to 41 weight percent of 2,2',5-trichloro-4,4'-methylene dianiline.

This composition is liquid at room temperature and is particularly useful as a crosslinking agent, particularly for epoxy resins, polyurethane elastomers and polyurethane foams.

This invention also comprises the preparation of the subject liquid amine compositions by the reaction of aniline, orthochloroanline, and 2,5-dichloroaniline in selected molar ratios with formaldehyde in the presence of an aqueous acid medium.

DESCRIPTION OF THE PREFERRED EMBODIMENT

The compositions of this invention have been succinctly defined above. They are the reaction products of a mixture of aniline, orthochloroaniline and 2,5-dichloroaniline with formaldehyde. The reaction takes place in an aqueous acid medium. Typically, there is reacted about 40 to about 57.5 mol percent aniline, about 40 to about 57.5 percent orthochloroaniline and about 2.5 to about 10 mol percent 2,5-dichloroaniline, based on the total anilines, i.e. aniline, orthochloroaniline, and 2,5-dichloroaniline. These molar percentage ranges are approximately equivalent to weight percentage ranges of about 32 to about 49 weight percent aniline, about 45 to about 64 weight percent orthochloroaniline and about 3.5 to about 14 weight percent 2,5-dichloroaniline based on the total anilines.

The formaldehyde is used in an amount such that the molar ratio of total anilines to formaldehyde present in the reaction mixture is in the range of 1.5:1 to 3:1, preferably about 2:1 which is the molar ratio of the desired reaction. The formaldehyde is generally added as a solution, preferably in a mutual solvent for the other ingredients. A solution of 37 weight percent formaldehyde, 6 to 7 weight percent methanol and 56 to 57 weight percent water has been found to be very useful.

The desired reaction between the mixed anilines and the formaldehyde can be carried out in any inert organic solvent such as the lower alkanols, ethers, aliphatic carboxylic acids or aromatic hydrocarbons, but water is the preferred reaction medium. Generally, the amount of water or other solvent is only sufficient to make the anilines-formaldehyde reaction system compatible. Water has been used to good advantage in amounts ranging from about 400 to about 850 pounds per pound-mol of total anilines, including the water added with the acid described below. Approximately 25 pounds of additional water per pound-mol of total anilines are added to the system with the formaldehyde if the formaldehyde is added as the formaldehyde-methanol-water solution described above.

The desired reaction between the mixed anilines and the formaldehyde is promoted by acids which inactivate the amine groups in the anilines. Strong mineral acids such as hydrochloric, nitric or sulfuric acid are preferred, but other inorganic or organic acids can be used such as phosphoric acid, p-toluenesulfonic acid, oxalic acid and trichloroacetic acid. The amount of acid should be at least one gram equivalent, preferably from about 1.5 to 2 gram equivalents, of acid per gram mol of total anilines. The maximum amount of acid is not really critical, but as a practical matter no more than about 5 gram equivalents of acid are used per gram mol of total anilines used as reactants. When the reaction of the anilines and formaldehyde is complete, the acid should be neutralized.

In the practice of this invention the anilines-formaldehyde mixture is heated at a temperature and pressure and for a time sufficient to produce the desired composition defined above, i.e. a mixture consisting essentially of (a) from 5 to 14 weight perecent of 4,4'-methylene dianiline;
(b) from 30 to 50, preferably 39 to 43, weight percent of 4,4'-methylene bis-2-chloroaniline;
(c) from 2 to 6 weight percent of 4,4'-methylene bis-2,5'-dichloroaniline;
(d) from 5 to 10 weight percent of 2-chloro-4,4'-methylene dianiline (or 2-chloro-4,4'-diamino diphenyl methane);
(e) from 1 to 3 weight percent of 2,5-dichloro-4,4'-methylene dianiline; and
(f) from 27 to 41 weight percent of 2,2',5-trichloro-4,4'-methylene dianiline.

Under ambient pressure this is generally accomplished by heating the mixture for from 1 to 6 hours at about 75° C. to about 95° C., preferably for at least about four hours at about 80° C. to about 90° C., ideally 85° C.±3° C.

The following example represents the best mode contemplated by the inventor for carrying out this invention:

EXAMPLE

A batch of about 1130 pounds of liquid amine product is synthesized in accordance with this invention by reacting about 443 pounds of aniline, about 605 pounds of orthochloroaniline (OCA), about 81 pounds of 2,5-dichloroaniline (2,5–DCA), and about 155 pounds of formaldehyde in an aqueous hydrochloric acid medium.

The physical properties of the three anilines are summarized in Table I.

TABLE I

| | Form | Molecular weight | Boiling point (° C.) | Melting point (° C.) |
|---|---|---|---|---|
| Aniline | Liquid | 93.12 | 184 | −6.2 |
| OCA | do | 127.50 | 208-9 | −14.0 |
| 2,5-DCA | Solid | 162.03 | 251 | 50 |

A reactor is first charged with 6000 pounds of water and 2880 pounds of aqueous hydrochloric acid (containing 32 percent by weight HCl). After permitting the mixture to cool and stabilize (at least 15 minutes), the 443 pounds of aniline are added to the reactor below the surface of the acidified water. After applying steam heat (at about 25 pounds pressure) to the reaction, the 605 pounds of orthochloroaniline are then added below the surface of the mixture. The 81 pounds of 2,5-dichloroaniline are added as a solid or can be melted (melting temperature 50° C.), heated to about 55° C., and then are added to the reactor above the mixture surface. The mixture is then steam heated to about 70° C. and 48 pounds of a solution of 37 weight percent formaldehyde, 6 to 7 weight percent methanol and 56 to 57 weight percent water are added over a 30 minute period. The mixture is then heated to above 80° C. and maintained at about 80° C. to 90° C. with regulation of steam pressure for about four hours of reaction time.

At the end of the four hours reaction time, the reaction product mixture is neutralized to a pH of about 7 to 8 using ammonia and about 175 gallons of water. The product mixture is then allowed to phase separate into a top layer and a bottom layer of organic liquid amine product.

The bottom layer is recovered and vacuum distilled at about 140° C. to 150° C. for about 30 minutes at no more than 10 to 15 mm. mercury absolute pressure so as to strip off water from the product until the product contains less than about 0.1 percent by weight water, additional heating at 150 to 160° C. being maintained for 30 minutes if necessary.

The recovered distilled amine product typically contains the following components as summarized in Table II.

TABLE II (a) From 5 to 14 weight percent of 4,4'-methylene dianiline.

(b) From 30 to 50 weight percent of 4,4'-methylene bis-2-chloroaniline.

(c) From 2 to 6 weight percent of 4,4'-methylene bis-2,5-dichloroaniline.

(d) From 5 to 10 weight percent of 2-chloro-4,4'-methylene dianiline (or 2-chloro-4,4'-diamino diphenyl methane).

(e) From 1 to 3 weight percent of 2,5-dichloro-4,4'-methylene dianiline.

(f) From 27 to 41 weight percent of 2,2',5-trichloro-4,4'-methylene dianiline.

The product is essentially an amber liquid having viscosity at 29° C. in the range of 30,000 to 50,000 cps. and a specific gravity of about 1.26. At room temperature, the product is very viscous, almost a gum. The unreacted aniline content is generally less than about 5 percent by weight. This can be removed by vacuum distillation if desired.

The product is soluble in alcohols, ketones and acidified water, slightly soluble in aromatic hydrocarbons and insoluble in plain water.

The product of this invention is a fully reactive liquid diamine crosslinking agent useful for curing urethane elastomers, flexible urethane foams, and epoxy resins.

The amine product of this invention can be used for curing urethane polymers in amounts ranging from 80% to 110% of theoretical equivalents (amino to isocyanate groups) with optimum concentrations at about 90% of theoretical. The product is ideally suited for flexible urethane foams. Holding the amine product at excessively high temperatures, 450° F. or above, causes thermal degradation resulting in hazardous fumes which are irritating. Holding the product at 250° F., however, produces no decomposition or gas generation. At 170° F. it becomes a very fluid, readily pourable liquid.

When the amine product of the example above is mixed with a polyetherurethane- or polyesterurethane-forming mixture of suitable polyol and organic isocyanate, said mixture having 4.2 weight percent isocyanate groups, the amine being used in an amount equal to 90% of the theoretical equivalent weight for the isocyanate groups present, the pot life of the system is found to be about one minute. When the mixture is mixed and molded at 212° F., the product can be demolded after 30 minutes. After curing 16 hours at 212° F. and post-curing two weeks at room temperature, the molded product has the following typical properties:

Hardness Shore A Durometer _____ 90
Tensile strength (p.s.i.) _____ 4000
Elongation at break (percent) _____ 400

Although this invention has been disclosed hereinbefore with reference to certain specific details, it is not to be so limited except as defined in the appended claims.

What is claimed is:

1. A composition consisting essentially of
   (a) from 5 to 14 weight percent of methylene dianiline;
   (b) from 30 to 50 weight percent of methylene bis-2-chloroaniline;
   (c) from 2 to 6 weight percent of methylene bis-2,5-dichloroaniline;
   (d) from 5 to 10 weight percent of 2-chloro-4,4'-methylene dianiline;
   (e) from 1 to 3 weight percent of 2,5-dichloro-4,4'-methylene dianiline; and
   (f) from 27 to 41 weight percent of 2,2',5-trichloro-4,4'-methylene dianiline.

2. A process which comprises chemically reacting a mixture of anilines consisting of about 40 to about 57.5 mol percent aniline, about 40 to about 57.5 mol percent orthochloroaniline, and about 2.5 to about 10 mol percent 2,5-dichloroaniline, based on the total amount of aniline, orthochloroaniline, and 2,5-dichloroaniline with formaldehyde, the molar ratio of total anilines to formaldehyde being about 2:1, in an aqueous acid medium wherein there is at least one gram equivalent of acid per gram mol of total anilines at a temperature and pressure and for a time sufficient to produce the composition of claim 1.

3. The process of claim 2 wherein the mixture of anilines and formaldehyde is reacted for from 1 to 6 hours at a temperature of about 75° C. to about 95° C.

4. The process of claim 3 wherein the acid is used in an amount of about 1.5 to about 2 gram equivalents of acid per gram mol of total anilines.

5. The process of claim 4 wherein the acid is a mineral acid selected from sulfuric, hydrochloric, and nitric.

6. The process of claim 5 wherein the anilines and formaldehyde mixture is reacted for at least about 4 hours at a temperature of about 80° C. to about 90° C.

7. The process of claim 4 wherein the temperature is about 82° C. to about 88° C.

References Cited

UNITED STATES PATENTS

| | | | |
|---|---|---|---|
| 3,379,691 | 4/1968 | Sundholm | 252—182 |
| 3,408,301 | 10/1968 | Sundholm | 252—182 |
| 3,412,071 | 11/1968 | Sundholm | 252—182 |
| 3,427,282 | 2/1969 | Sundholm | 260—47 EN |
| 3,563,906 | 2/1971 | Hoeschele | 252—182 |
| 3,634,275 | 1/1972 | Sundholm | 252—182 |

FOREIGN PATENTS 1,142,667  2/1969  Great Britain _____ 252—182

LEON D. ROSDOL, Primary Examiner

I. GLUCK, Assistant Examiner

U.S. Cl. X.R.

252—401; 260—47 EN, 47 EP, 59, 570 D